US008358638B2

(12) United States Patent
Scherzer et al.

(10) Patent No.: US 8,358,638 B2
(45) Date of Patent: Jan. 22, 2013

(54) DYNAMICALLY CREATED AND EXPANDED WIRELESS NETWORK

(75) Inventors: Tamir Scherzer, Herzelia (IL); Shimon Scherzer, Mountain View, CA (US)

(73) Assignee: Wefi, Inc., Mountain View, CA (US)

( * ) Notice: Subject to any disclaimer, the term of this patent is extended or adjusted under 35 U.S.C. 154(b) by 1258 days.

(21) Appl. No.: 11/853,987

(22) Filed: Sep. 12, 2007

(65) Prior Publication Data

US 2008/0293404 A1 Nov. 27, 2008

Related U.S. Application Data

(60) Provisional application No. 60/940,028, filed on May 24, 2007.

(51) Int. Cl.
*H04W 4/00* (2009.01)
(52) U.S. Cl. .................. 370/338; 370/349; 455/426.1; 455/432.3
(58) Field of Classification Search .......... 370/338, 370/329, 349, 310, 328; 455/512, 500, 517, 455/426.1, 432.3
See application file for complete search history.

(56) References Cited

U.S. PATENT DOCUMENTS

| | | | |
|---|---|---|---|
| 7,103,661 B2 | 9/2006 | Klein | |
| 7,266,595 B1 | 9/2007 | Black et al. | |
| 7,483,984 B1 | 1/2009 | Jonker et al. | |
| 7,668,147 B2 * | 2/2010 | Lindsay et al. | 370/347 |
| 2004/0066759 A1 | 4/2004 | Molteni et al. | |
| 2005/0070279 A1 | 3/2005 | Ginzburg et al. | |
| 2006/0168438 A1 | 7/2006 | Klein | |
| 2006/0217131 A1 * | 9/2006 | Alizadeh-Shabdiz et al. | 455/456.1 |
| 2006/0271517 A1 * | 11/2006 | Deloach | 707/3 |
| 2007/0066304 A1 | 3/2007 | Lee | |
| 2007/0167174 A1 * | 7/2007 | Halcrow et al. | 455/456.2 |
| 2007/0167182 A1 * | 7/2007 | Tenhunen et al. | 455/512 |
| 2008/0013487 A1 | 1/2008 | Molteni et al. | |
| 2008/0132175 A1 * | 6/2008 | Loeb et al. | 455/68 |
| 2008/0285489 A1 * | 11/2008 | Meier | 370/280 |
| 2010/0296441 A1 * | 11/2010 | Barkan | 370/328 |

* cited by examiner

*Primary Examiner* — Hassan Phillips
*Assistant Examiner* — Saba Tsegaye
(74) *Attorney, Agent, or Firm* — Nixon Peabody LLP; David F. Crosby (57) ABSTRACT

A system and method for the establishment and maintenance of wireless network, such as wireless network enabling access to the World Wide Web. The network can be created by its users as part of social network activity. The users are using automated resources discovery, verification and mapping as a comprehensive wireless resources search engine. Once few locations are mapped as wireless service "hot spots," the service area can be expanded as users keep discovering and mapping more resources. These existing wireless Internet access resources could be mined by users to create spontaneous wireless network providing wide area high-speed data service.

4 Claims, 7 Drawing Sheets

Figure 7

DYNAMICALLY CREATED AND EXPANDED WIRELESS NETWORK

RELATED APPLICATIONS

This application claims priority from U.S. Provisional Patent Application Ser. No. 60/940,028 filed on May 24, 2007, the disclosure of which is incorporated herein by reference in its entirety.

BACKGROUND

1. Field of the Invention

The subject invention relates to the establishment and maintenance of wireless network, such as wireless network enabling access to the World Wide Web.

2. Related Art

Traditional data/voice networks are built based on usage forecasting and speculations. For example, a cellular network is normally deployed to provide service over given area (city, district etc.) based on forecasted usage pattern in that area. That is, the capacity and capability of the network is designed based upon forecasting and estimated usage. However, while voice usage pattern is relatively predictable due to long-term experience in the industry, broadband wireless service usage is highly speculative. Consequently, traditional wireless broadband network deployment may be inefficient and expansive (already experienced in city WiFi networks). That is, without accurate knowledge of future wireless broadband usage it is difficult to effectively design the location of access points and the capacity and capability of the network. Wireless operators face a great financial challenge providing acceptable voice service (as required by the spectrum allocation contracts). Financing broadband wireless service may be much more challenging due to much higher deployment density required by the short range of WiFi transmitters as compared with cellular telephony.

The fast proliferation of WiFi creates a new reality in wireless Internet access: free wireless Internet access is rapidly proliferating by various entities. For example, various establishments, such as coffee shops, book stores, etc., provide wireless Internet access by WiFi in order to increase customer traffic. While such establishments create access points to the Internet, currently no integration of these access points is provided. Therefore, knowledge of the location and coverage area of such access points cannot be obtained prior to actually being at a location and attempting to connect to such an access point. Consequently, in this sense all of these access points are sporadic individual resources that do not form a network. In this context, a network is considered to exist when its resources are accessible and usable; i.e., its elements are discovered and located such that users can exploit them.

In the current state of the art, clients are installed on wireless communication devices (e.g., Intel™ PROSet Wireless client for laptops) in order to detect and connect to wireless access points. Most current WiFi clients evaluate signal level measurements and encryption status before settling on a new WiFi resource (access point). Unfortunately these measurements are far from sufficient to guarantee seamless connectivity, for example:

Radio link is not symmetrical (i.e., uplink and downlink characteristics). Consequently it is hard to rely on access point signal level as received by the client in order to predict whether the access point can properly hear the client device.

Many WiFi access points incorporate various connection barriers such as MAC filtering (or EUI filtering or layer 2 address filtering).

Some WiFi access points DHCP servers are disabled, thereby preventing access to the Internet even if the client connects to the access point. The DHCP (Dynamic Host Configuration Protocol) is a set of rules used by communications devices such as a computer, router or network adapter to allow the device to request and obtain an IP address from a server which has a list of addresses available for assignment.

Backhaul may be either disconnected or overwhelmed by Internet traffic, thereby preventing access to the Internet or providing poor service even if the client connects to the access point.

Typical WiFi clients, such as Windows WZC, Intel, Dell and others present a choice of WiFi resources (access points) that can be heard by user terminal. The user then must select one of the presented resources and initiate connection. Since the client does not pre-validate the WiFi source Internet capability, the connection may fail and the user must select and try another resource. Moreover, as noted above, even if the connection succeeds, Internet connection may not be available, may be poor, or may require sign up and/or payment to a captive portal (e.g., T-Mobile™ HotSpot™, etc.). Consequently, the user may need to spend time searching and trying various resources until achieving success. Moreover, even if a successful connection achieved, there may be another resource providing better connection, but the user may not know that unless the user tries all of the available resources, which may take much time and effort.

Devices that do not include adequate or convenient user interface (screen, keyboard, etc.) may require automated connection capability, since user based selection process is not possible or not easily implemented.

As mobile communication proliferates, users expect continuous connectivity even during motion. Such connectivity requires "hopping" or roaming between access points. Internet access verification is instrumental while roaming between WiFi resources; i.e., once the client must leave the current access point and jump to a new one, it better make sure that the new access point is available and provides solid service. However, current devices and clients only check for AP encryption status and signal strength, but do not test for connectivity and access to the Internet.

Accordingly, a solution is needed for constructing a wireless network that provides service commensurate with usage. The network should be updatable in real time as resources are added or removed from service. Additionally, the network controller should communicate with clients to provide updates and enable improved connectivity even during motion.

SUMMARY

The following summary of the invention is provided in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Various embodiments of the subject invention provide a radically different approach for data network deployment;

namely, a network that grows spontaneously with usage and is updated in real time with usage.

Various embodiments of the subject invention provide a spontaneous network that, unlike traditional network where infrastructure is physically deployed, can be created by its users by providing and receiving information. As users are connected to various resources and use the Internet, they enable each other to gain access to the Internet. In various embodiments the network can be created by the users as part of social network activity. In either case, the users are using automated resources discovery, verification and optionally mapping as a comprehensive wireless resources search engine. Once few locations are mapped as wireless service "hot spots," the service area can be expanded to "free WiFi zones" as users keep discovering and mapping more resources. These existing wireless Internet access resources could be mined by users to create spontaneous wireless network providing wide area high-speed data service with a-priory knowledge of availability and service quality.

Various embodiments of the subject invention provide automated discovery, verification and seamless connectivity to generate the spontaneous wireless network. The process depends on users' participation and, therefore, the discovery, verification and seamless connectivity processes are made as seamless as possible to encourage participation. In various embodiments the automated discovery, verification and seamless connectivity is enabled by a client that runs on the user's mobile device and reports to a central server about its activities, so as to update the network in real time.

According to various embodiments of the invention, connection profile (i.e., accessibility) and connection quality is stored for each access point. In the context of this description, connection profile relates to the objective data needed in order to gain access to a resource. This may include, e.g., SSID, password, gateway IP address, DNS IP, MAC address, set of strings that are used to provide for automated registration when captive portal is used, username, password, etc. On the other hand, connection quality includes subjective variable that describe the quality of service available from the resource. This may include, e.g., data rate (or average data rate), data rate vs. signal strength (vector of few values), rate of dropped connections in given time, stability, bandwidth loading, etc. According to a feature of the invention, connection quality may also includes descriptors of the physical location where the access point is located. For example, the descriptors may include the type of establishment (restaurant, coffee shop, etc.), environment condition (e.g., seating available, noisy location, etc.), other services available (e.g., close to train station, food service available, etc.), and other descriptors. Also, in the context of this description connection type describes accessibility characteristics, such as, e.g., free access, encrypted WPA, encrypted WEP, captive portal (ex. Google). Etc.

According to aspects of the invention, a system for creating and maintaining a dynamically expendable and updatable wireless network is provided, comprising: a network server connected to a network, the network server comprising a processor and a database, the database storing data relating to access point resources of the wireless network, wherein the sever receives updates from clients regarding available wireless access points, and stores data included in the updates to maintain the database and to thereby dynamically expand and update the wireless network. The updates from clients may include location of access point, connection profile, and connection quality available from the access point. The connection quality comprises one or more of: descriptor of data rate vs. signal strength, rate of dropped connections, bandwidth loading expected data rate, reliability, stability, and location's physical characteristics. For each AP, the processor may calculate an access quality estimation value based at least on the time elapsed from the first discovery of the AP to the most recent connection by any user, number of users who successfully utilized the AP since its discovery, and average data rate provided by the AP to all of the users who successfully utilized the AP. The server may transmit connectivity data to a respective client upon at least one of the following events: each time a registered user logs in to the Internet, when general location of the client is known, when connection is available, and when the client requests the information. The connectivity data may comprise availability of connection and access quality estimation for at least one of: all AP's in a geographical location of the registered user; and, all AP's in a geographical location selected by the user. The client may select access points for connection based on the connectivity data received form server. The client may sort access points for connection based on the connectivity data by decreasing order of connection quality. The connectivity data may be transmitted via at least one of broadband connection and cellular connection.

According to further aspects of the invention, a system for creating and maintaining updatable broadband service is provided, comprising: a network server connected to a network, the network server comprising a processor and a database, the database storing data relating to access point resources of the wireless network; a plurality of clients, each installed on a respective mobile computing device of a respective user; wherein each of the clients searches for access points in the vicinity of its respective mobile device and perform quality check of at least one discovered access point and sends a report to the network server about the discovered access points, their locations, their connection profile, and the results of the quality check; and wherein the sever receives the reports from the clients and uses the updates to maintain the database to thereby dynamically expand and update the wireless network. The quality check may comprise a check of at least one of: estimated potential data rate, descriptor of data rate vs. signal strength, rate of dropped connections, bandwidth loading, reliability, location's physical characteristics, and connection stability. The server may transmit connectivity data to a respective client upon at least one of the following events: each time a registered user logs in to the Internet, when general location of the client is known, when connection is available, and when the client requests the information. The connectivity data may comprise connection profile, connection type, and access quality estimation for at least one of: all AP's in a geographical location of the registered user; and, all AP's in a geographical location selected by the user. Each client may maintain a plurality of updatable cache entries, each cache entry corresponding to an access point and comprises at least: SSID; MAC address; and location of the access point. Each cache entry may further comprise at least one of quality, persistency, networking parameters, access timing, and captive portal rules of the corresponding access point and location type. The access timing may comprise at least one of association response time, WPA response time, and DHCP response time; networking parameters comprise at least one of gateway, subnet, external IP, and DNS; and captive portal rules comprises indication whether login and payment are required.

According to yet further aspects of the invention, a method for creating and maintaining a dynamically expendable and updatable wireless network is provided, comprising: distributing a plurality of clients to a plurality of users mobile devices; installing a server and coupling the server to the Internet; receiving at the server resource reports from the clients and using the reports to construct and update a network of Internet connectivity resources, wherein for each resource the reports comprise at least the resource geographical location, the signal strength, and connectivity quality; transmitting to the plurality of clients updates, the updates comprising location, connection profile, and connectivity quality of resources in at least the geographical vicinity of each respective mobile device. During the time the mobile device is connected to a resource, the client may be operated to periodically: check for transmitted/received packets and, if packets are transmitted or received, sleep for a predetermined period; otherwise attempt DHCP a preprogrammed number of times and, if successful, sleep for a predetermined period; otherwise disconnect from the resource and clear the SSID and thereafter initiate a new connection procedure. The client may be operated to periodically perform Internet availability testing. The internet availability testing may be performed by connecting to an access point, sending a message to a server via the access point, and receiving a reply from the server via a second access point. The message may comprise a return address pointing to the second access point. The method may further comprise determining whether a received response is from a captive portal resource and reporting to the server whether the resource is captive portal or not. The method may further comprise operating each client to periodically perform neighboring resources verification. During the neighboring resources verification the client may be operated to perform the steps: a. check whether communication traffic is flowing between the mobile device and a default resource and, if so, sleep for a predetermined period; otherwise b. check whether other resources are available at the current geographical location of the mobile device and, if not, sleep for a predetermined period; otherwise c. disconnect from current resource, select a neighboring resource, and attempt to connect to the neighboring resource, and: if connection is successful, execute DHCP discovery and, if successful, stored neighboring resource ID, geographical location, and availability of Internet connection, then proceed to step d; if connection is not successful, save neighboring resource ID, geographical location, and indication of unsuccessful connection attempt, then go to step d; d. check whether counter passed a predetermined count threshold and, if not, go to sleep for a predetermined period; otherwise transmit report to server. In step c, when connection is successful, the client may send a message to a target server and terminate the connection to the neighboring resource and reconnect to the default resource.

According to other aspects of the invention, a method for performing neighboring resources verification in a current geographical location of a mobile device is provided, comprising:

a. checking whether communication traffic is flowing between the mobile device and a current resource and, if so, sleep for a predetermined period; otherwise b. checking whether other resources are available at the current geographical location of the mobile device and, if not, sleep for a predetermined period; otherwise c. disconnect from the current resource, select a neighboring resource, and attempt to connect to the neighboring resource, and:

d. if connection is successful, send message to a target server, disconnect from the neighboring resource, reconnect to the current resource, and listen for a reply from the target server via the current resource. The step of sending a message may comprise appending to the message a return address pointing to the current resource.

BRIEF DESCRIPTION OF THE DRAWINGS

Other aspects and features of the invention would be apparent from the detailed description, which is made with reference to the following drawings. It should be appreciated that the detailed description and the drawings provides various non-limiting examples of various embodiments of the invention, which is defined by the appended claims.

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIG. 6A is a flow chart illustrating the operation of an Internet availability verification daemon according to an embodiment of the invention, while

DETAILED DESCRIPTION

The following description of various embodiments of the subject invention illustrate a network that can be created by its users during normal use of mobile devices, so that the network is created and modified spontaneously with usage. The network may be created as part of social network activity. According to various embodiments of the invention, the users are using automated or semi-automated resource discovery, verification and mapping, as a comprehensive wireless resources search engine. Once few locations are mapped as wireless service "hot spots," the service area can be expanded as users' clients keep discovering and mapping more resources. These existing wireless Internet access resources could be mined by users to create spontaneous wireless network providing wide area high-speed data service. The network is updated in real time as user's mobile devices are connected to the Internet. The client residing on the user's device utilizes data of the network to enable easy connection and transfer from one access point to another when the user moves geographically or when a better access point is available.

Figure 1:
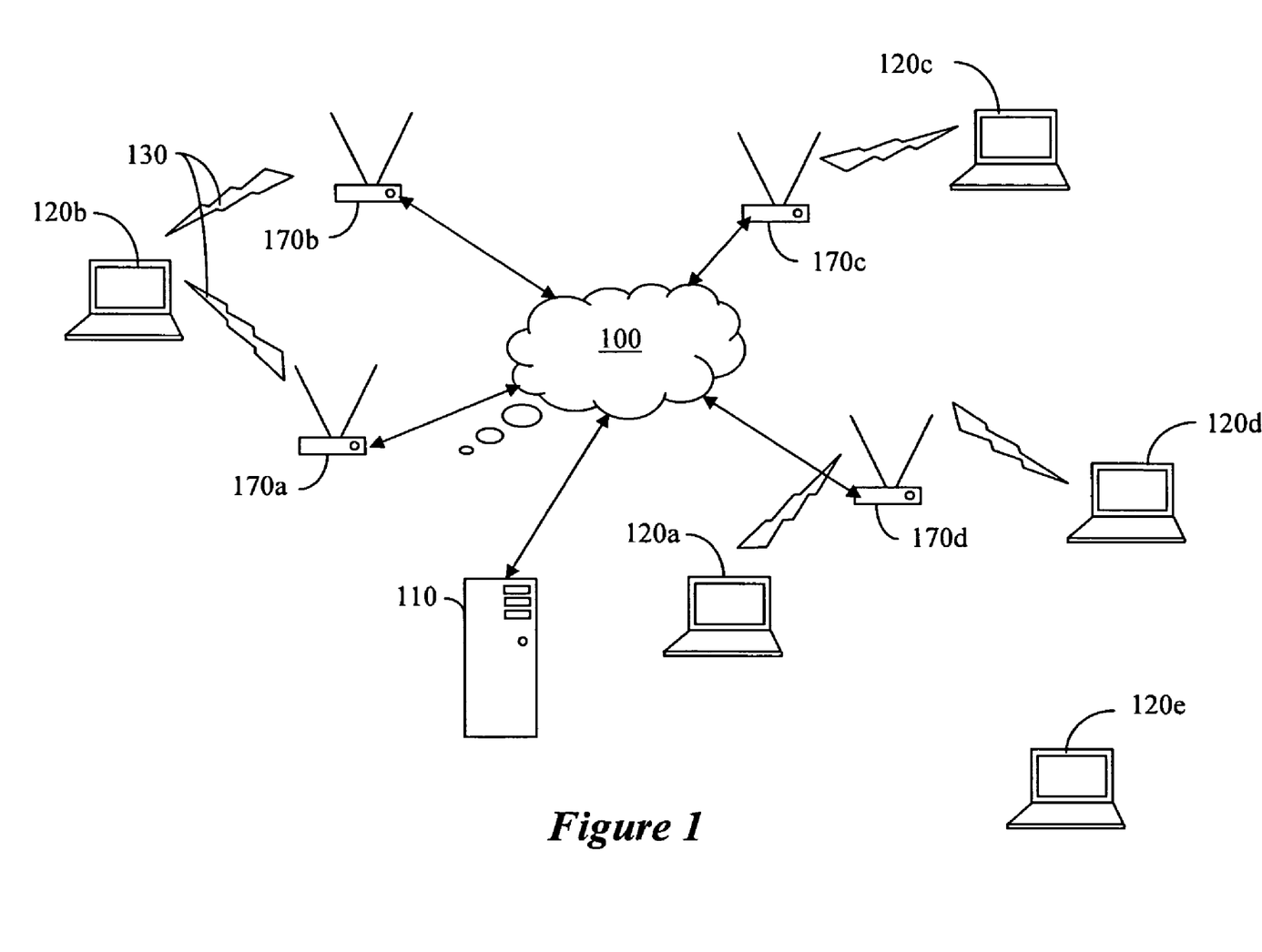
FIG. 1 is a general layout schematic diagram of the dynamic network according to an embodiment of the invention.
Figure 2:
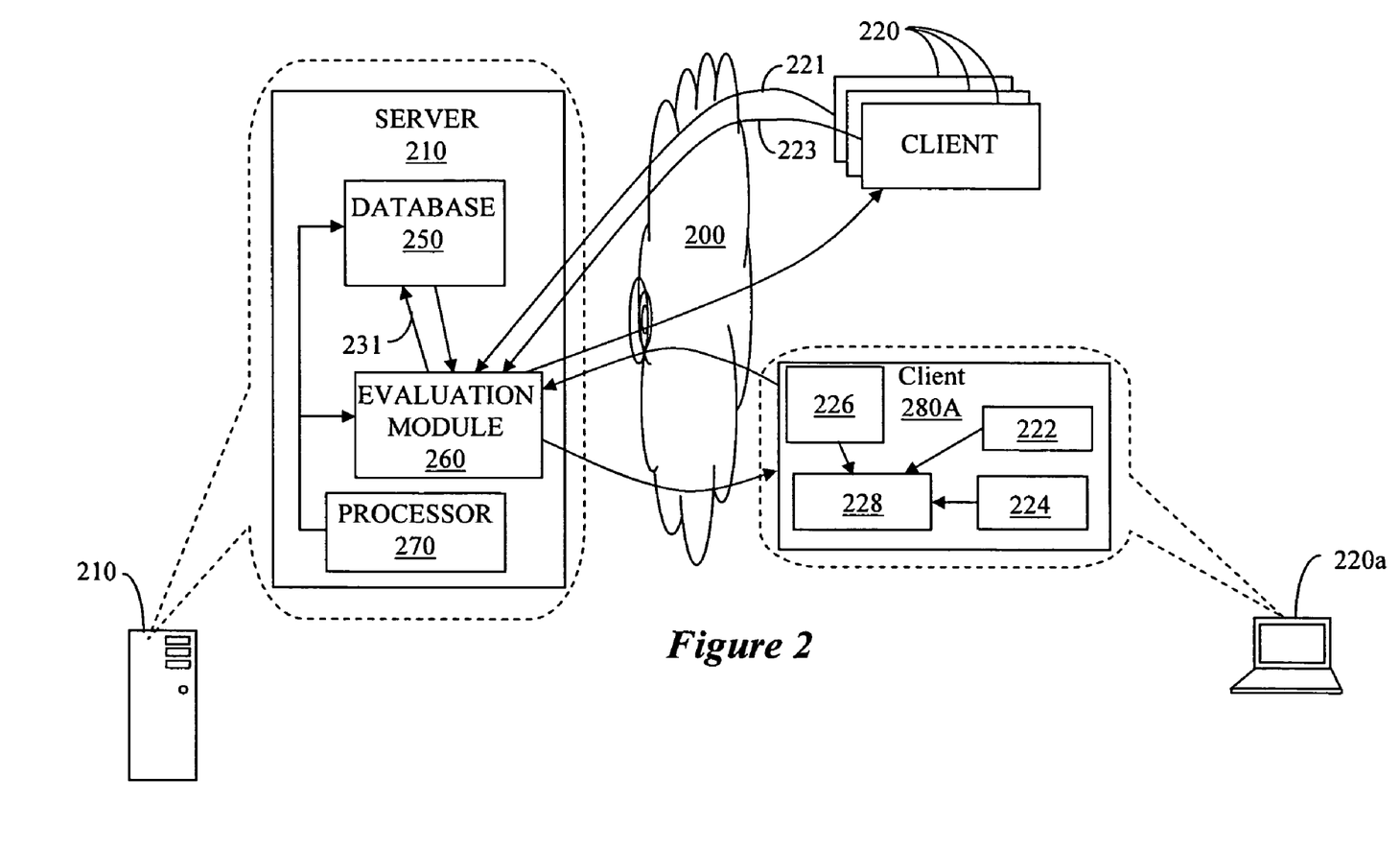
FIG. 2 illustrate a more detailed layout schematic of the dynamic network of FIG. 1.

FIG. 1 is a general schematic illustrating a system layout according to an embodiment of the invention, while FIG. 2 illustrates further details of the layout of FIG. 1. Notably, in FIG. 2 relevant details of the main server 210 and client 280A residing in terminal 220a are shown. For clarity, the access points 170a-170d are not shown in FIG. 2, but it is understood that all communication with the terminals is done via at least one access point or cellular network.

In FIG. 1, various computing terminals, e.g., laptops, PDA's, smart phones, etc., 120a-120e attempt to connect to the network 100, e.g., the Internet. In this example, various access points (AP's) 170a-170d provide radio communication and may or may not enable connectivity to the network 100, and may or may not require login and/or payment of access fee. The access points are installed world-wide by various individuals and/or entities desiring to provide connectivity to the Internet via radio communication.

As is shown in FIG. 1, terminal 120b is able to received radio transmission from either AP 170a or 170b (indicated by arrows 130) and may select one of them to connect to the Internet. Terminals 120c and 120d receive radio communication from AP's 170c and 170d, respectively. Terminal 120a is transmitting radio communication to AP 170d, while terminal 120e is unable to receive any radio communication.

Each of the terminals 120a-120e runs a client implemented according to an embodiment of the subject invention. Once a terminal connects to the Internet 100 via any AP, the client communicates with server 100 to enable dynamic updating of the network and improved connectivity of the terminals. For example, client 280A is installed and is run on terminal 220a. Similar clients run in the other terminals, and are referred to collectively herein as clients 280. Certain elements of clients 280 are depicted in exemplary client 280A. As shown in FIG. 2, according to this embodiment, client 280A comprises an access point suitability verification daemon or module 222, an Internet connection verification daemon or module 224, neighboring access points verification daemon or module 226, and AP database 228. The functionality of these elements will be described below with respect to a method implemented according to an embodiment of the invention.

When any of the terminals running client 280 is connected to the Internet, the terminal sends updates in the form of connectivity reports to server 210, as shown by arrows 221, 223. The updates include data collected when each client attempts to connect to an access point and may be in the form of historical report of several historical attempts, as will be explained further below. Similarly, when the terminal connects to the Internet it also receives updates from the server 210. These updates include data about new AP's recently added to the network and AP's that were removed from the network, AP current loads, access parameters, etc. Depending on the implementation and on the user's preferences, the updates may be all encompassing or only relating to AP's in the geographical area(s) of interest to the user.

Server 210 includes database 250, which stores historical data about radio broadband access resources. Server 210 also includes a processing module 260, which evaluates accessibility (i.e., connection profile) and bandwidth of various AP's based on clients' reports and stores the information as an update in database 210, as shown by arrow 231 A processor 270 controls the operations of the database 250 and evaluation module 260, and communication with the clients 280.

According to an embodiment of the invention, at time zero the database 250 of server 210 may be empty, at which point no network is constructed. However, when clients 280 begin to send connectivity reports to the server 210, processing evaluates the reports and determine whether they includes data on a new AP, revised data on previously stored AP, or already available data about previously stored AP. The new and revised data is used to update the database 250, to thereby construct and update a network in real time as reports are received. In this manner, the entity maintaining the server 210 need not deploy a network and access points beforehand; rather, as other entities deploy AP's and these AP's are discovered by clients 280, these AP's are added to the list of resources maintained in the database 250. Consequently, the network constructed in database 250 relates to AP's of actual usage, not of forecasted usage.

As can be understood, the server 210 continuously receives measurements from various clients 280 that are connected to access points. The server 210 uses the measurements from the clients to update the database 250 so as to dynamically update the network. In this manner, the database 250 is enhanced and continuously updated to include up to date data on any AP's that were newly put to service, modified, or removed from service. This data is sent to the clients 280, so as to update each client's database. However, in order to conserve resources, according to one embodiment, only data relating to AP's in the client's general neighborhood is sent. According to another embodiment the user can indicate for which geographical area the user wishes to obtain updates. In this manner, for example, if the user intends to take a trip to a different location, the client can request an update of available AP's at the destination location beforehand. Similarly, if the user continuously commutes between two or more locations, the user may request constant updates for these indicated locations.

According to embodiments of the invention, the network clients continuously collect radio resources information. These clients could be executing on laptops, handheld devices (PDA's), cellphones, or any other devices that incorporate radio facility, such as WiFi. For example, laptop based clients can conduct radio survey while the laptop is on. Handheld units can execute this function either while activated for Internet use or while idle (i.e., in the user's pocket). Each active user terminal should be able to conduct radio resources' survey whenever it is in use. This is achieved by "measurement trips": the client is directed to associate with an AP in reach (sometimes—other than the one used for current Internet connection), and conduct data acquisition as described below. In one embodiment, these "trips" are executed while no time-sensitive traffic is performed, so as to avoid degradation of the user's experience, as described below. In another embodiment, if fast enough, the measurement trips can be executed while time sensitive traffic continues. In any case, to simplify description the term "down time" is utilized to indicate a time where the client can perform such trips. This may be a time where the system idles, a time where there is a sufficiently long break in transmission activity, etc. In this context, "down time" does not indicate that the system must be in off position.

Using the trips performed during down time, the client may check one or any of: AP's accessibility, Internet reachability and estimate connection quality. This is executed from time to time by either leaving the current connection (when already connected) or trying to connect to APs in reach and performing certain actions as detailed below. This may be done during live connection (if do not interfere with an on-going session or when the device is not in session (ex. Idling Phone with WiFi).

Figure 3:
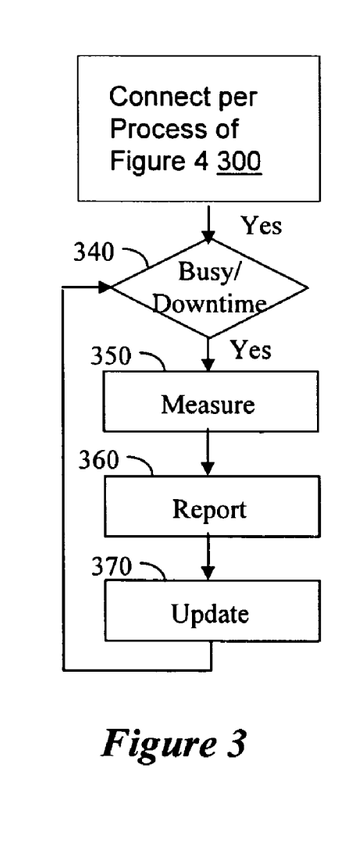
FIG. 3 is a flow chart illustrating a method to be executed by a client, according to an embodiment of the invention.

FIG. 3 is a flow chart illustrating a method to be executed by a client, according to an embodiment of the invention. While the steps illustrated in FIG. 3 and described herein are in certain order, it should be appreciated that the various steps may be performed in a different order. In order to connect to a broadband network, in Step 300 the client 220A executes the process described below with respect to FIG. 4. While the client's device is connected, at Step 340 the client checks whether the device is in downtime, e.g., there is a lull in communication between the device and the network. If so, at Step 350 the client measures parameters of other available AP's and at Step 360 the client reports the measurements to the server 110. At Step 370 the client may receive an update from server 210, which may includes data obtained from other clients and sent to the server 210, and use that data to update its local database 228.

According to embodiments of the invention, among the parameters reported and stored for each AP is quality of connection. The parameter quality of connection may take into account bandwidth loading. For example, in situations where many AP's are available and many users are present, it often happens that most users use one specific AP, e.g., the first listed AP. Consequently, one AP may experience high load, while others low load. Therefore, it may be the case that one AP may have lower radio reception strength, but be very lightly loaded so that it would be preferable to choose such an AP over one with high reception strength, but which is heavily loaded. The client according to the embodiment of the invention therefore checks load in addition to other connection quality parameters.

As can be seen from the above, according to one embodiment of the invention, individual user's clients may exploit gaps in traffic communication to execute radio measurements on radio resources (ex. WiFi access points) in their neighborhood (i.e., resources "in reach") to evaluate their ability to provide broadband access. According to one particular embodiment, this evaluation goes way beyond the normal RSSI/security evaluation done by typical WiFi clients. Specific example of such evaluation will be provided further below. The client's measurements reports are relayed to network server, so that the historical radio resources database (i.e., slow varying data) is gradually expanded and updated at the network server.

Figure 4:
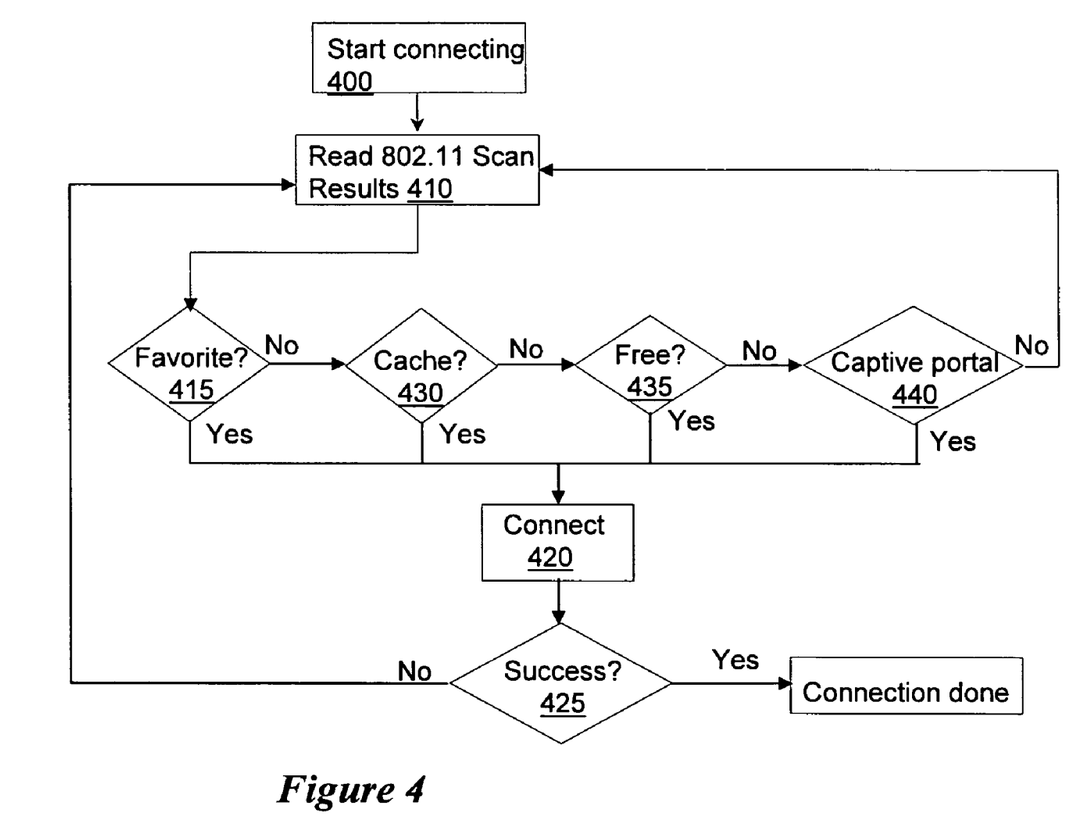
FIG. 4 is a flow chart illustrating the overall operation of connecting to an AP according to an embodiment of the invention.

Various embodiments of the subject invention provide automated discovery, verification and seamless connectivity and reporting mechanism to generate the spontaneous wireless network. The process depends on users' participation so the discovery, verification and seamless connectivity processes are made as seamless as possible. Therefore, embodiments of the subject invention provide methods for expediting and maintaining connection over WiFi networks. These methods utilize real-time connection verification with historical data of connection resources. Real time process may be based on, for example, conventional 802.11 basic measurements (RSSI, encryption status). Historical data is produced by examining long term statistics of the persistency and average speed of data, as provided to community of users. As the amount and quality of the historical data increase, the real-time process becomes less critical. The evaluation process may incorporate the following verification elements:

802.11 scan
    Access point suitability verification daemon
    Internet connection verification daemon
    Neighboring access points verification daemon
    Historical data processing and caching
    WiFi connection procedure as illustrated in FIG. 4.

These elements of the connection process are provided as follows.

The 802.11 scan may be implemented according to conventional and well-defined protocols in the relevant art (Step 410 of FIG. 4).

The access point verification daemon continuously evaluates the connected access point suitability to provide wireless service and its quality. This daemon incorporates:

Passive test: traffic activity originated at access point.
    Active test: DHCP server activity or ARP (Address Resolution Protocol) to gateway.

The passive test is provided as follows. "Healthy" WiFi access point properly connected to wide area network (WAN) generates miscellaneous traffic frames on the network. This traffic may be driven by applications running on user terminal (SKYPE, IM etc.), other devices on the network (ARP), control frames, etc. The daemon monitors the traffic traversing through and determines the activity on the connection accordingly. The connection is considered healthy if traffic activity is detected. In addition, RSSI is tested against pre-determined minimum threshold. RSSI (Received Signal Strength Indication) is a measurement of the received radio signal strength (energy integral, not the quality).

If during passive test no traffic activity has been detected, the client performs an active test by trying a DHCP exchange (or partial DHCP exchange) with the access point. Alternatively, the client may generate ARP to access point's gateway. In either case a healthy access point will respond to DHCP request (or discover) or to ARP request by proper message: DHCP discovery will be responded by DHCP address and offer, while ARP request will be responded by ARP response. Notably, the active test should be used very sparely since it loads the network with undesirable traffic. However, especially at first access when no other information is available, active test may be a required. Also, when roaming capability is needed, the daemon will test connection RSSI to determine whether to roam to another access point.

Figure 5:
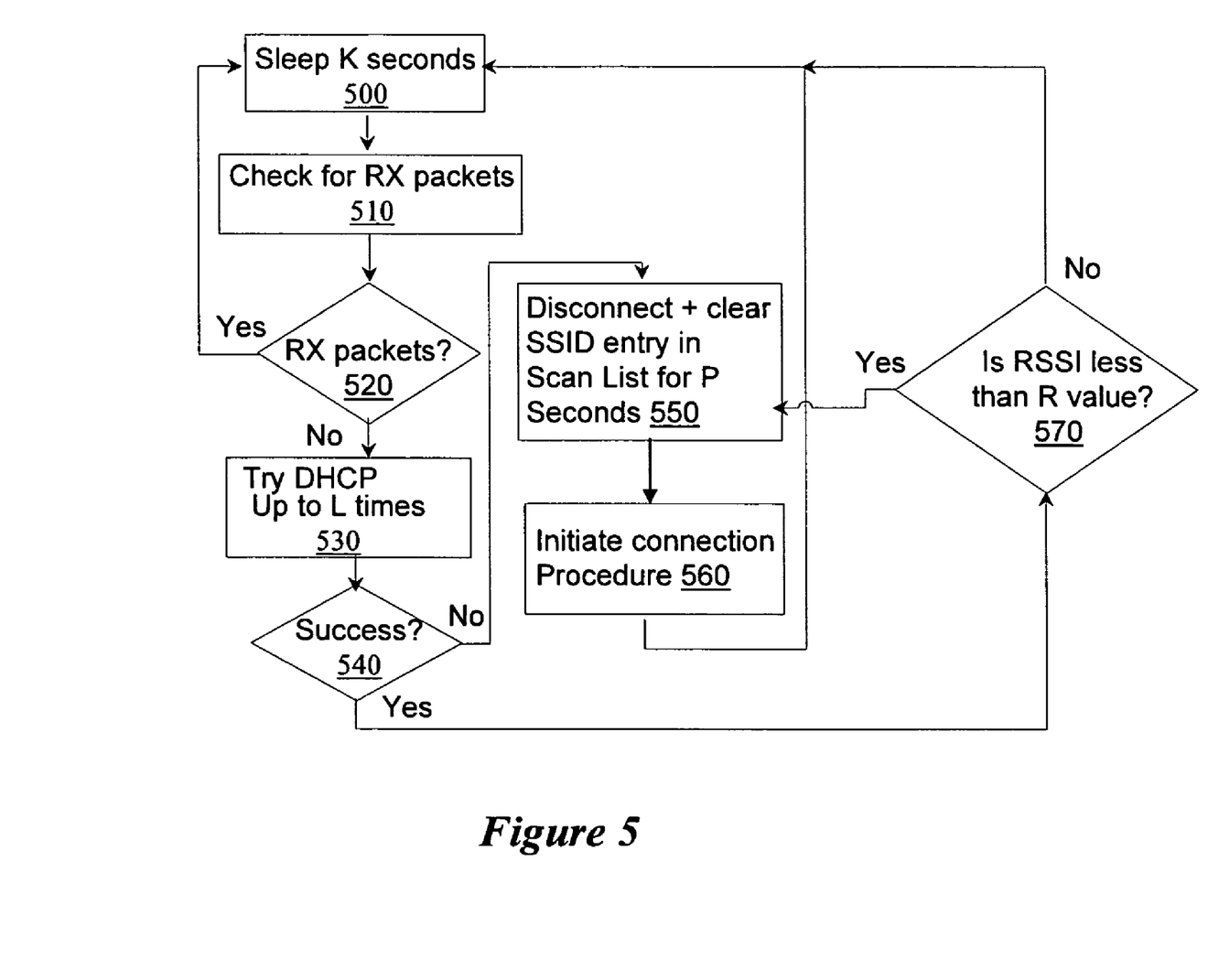
FIG. 5 is a flow chart illustrating the operation of an access point suitability verification daemon according to an embodiment of the invention.

FIG. 5 is a flow chart illustrating the operation of an access point suitability verification daemon according to an embodiment of the invention. The access point suitability verification daemon operates upon termination of a predetermined count, e.g., k seconds, illustrated in Step 500. When k seconds pass, the daemon checks for packet transmission or reception at Step 510. If at Step 520 transmission or reception of packets is detected, the process reverts to Step 500 where the daemon sleeps for another k seconds. On the other hand, if no packet transmission or reception has been detected in Step 520, the process proceeds to Step 530, wherein the daemon tries DHCP for predetermined times, e.g., L times. If at Step 540 it is determined that DHCP was successful, the process proceeds to Step 570; otherwise the process proceeds to Step 550. At Step 550 the client disconnects from the AP and clears the SSID in the 802.11 scan list for a predetermined time period, e.g., P seconds. The process then proceeds to Step 560, wherein the client initiates conventional connection procedure (e.g., scans for AP's and connects to best or selected AP). The process then reverts to Step 500. On the other hand, at Step 570 it is determined whether the RSSI is less than a predetermined value, e.g., R. If so, the process proceeds to Step 550; otherwise the process reverts to Step 500.

The Internet access verification daemon operates as follows. WiFi resources normally support Internet access through wide area network (WAN) that is used as backhaul. The decision to either connect or stay connected to a specific access point could be based on backhaul quality (connected/not-connected, speed, etc.). For example, other users may excessively load the backhaul; causing traffic to dramatically slow down. The Internet access verification includes:

Passive test: checking WAN originated traffic.
    Active test: calling known websites.

The Internet access verification daemon passive test is very similar to the passive test described above and is aimed at identifying WAN originated traffic. This test is constantly performed while connected to the access point to identify loss of Internet connectivity or excessive traffic load on WAN. The client constantly measures the traffic load and reports it to the server. The server further uses this gathered information for aiding the client in evaluating the bandwidth availability at the AP and evaluates the quality of the connection.

The active test may be used to evaluate Internet connection quality. Internet connection quality can be determined by calling upon known websites; this may be executed using, e.g.:

"HTTP get" calls to multiple websites. Once an HTTP get is successful, Internet connection is determined to be alive.

Generating a UDP (User Datagram Protocol) frame (via ports 53 and 80 or any other port) to a special server at the network control center. Arrival of this UDP frames shows Internet connection is active. The advantage of this approach is that there is no need for response; the feedback can be delivered through normal conversation between client and network server later on.

Figure 6A:
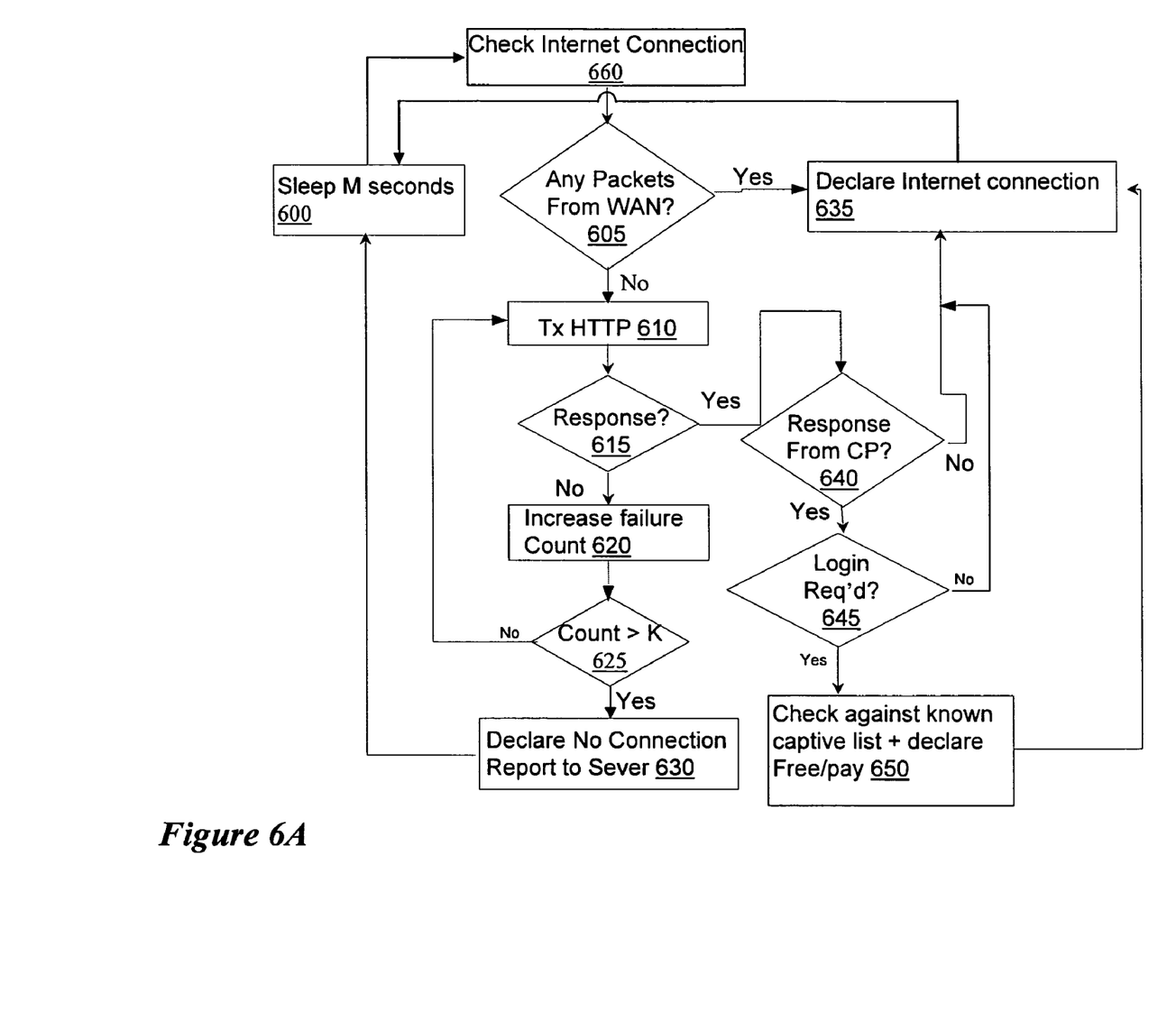

FIG. 6A is a flow chart illustrating the operation of an Internet availability verification daemon according to an embodiment of the invention. This daemon also wakes periodically (Step 600) and performs Internet connection procedures (Step 660) as follows. If at Step 605 the client detects a packet transmission or reception from the WAN, it reports the connection is fine (Step 635) and reverts to step 600. On the other hand, if no packet is detected, the process proceeds to Step 610 where the client transmits HTTP request to a known URL, such as Yahoo™, Google™, etc. At Step 615 the client checks whether a response is received from the URL. If a response is received, the process proceeds to Step 640; otherwise it proceeds to Step 620.

At Step 620 the client increases a failure counter and at Step 625 checks whether the failure count exceeds a preset threshold, K. If the threshold is not reached, the process reverts to Step 610; otherwise the process proceeds to Step 630. At Step 630 the client declares no connection and reverts to Step 600. On the other hand, at Step 640 the client checks whether the connection is via a captive portal. If not, the process proceeds to Step 635 to declare Internet connection is fine, and reverts to Step 600. If the connection is via a captive portal, at Step 645 it is checked whether a login is required. If not, the process proceeds to Step 635; otherwise the process proceeds to Step 650, wherein the captive response is checked against known list to determine whether the captive provider is listed in the login list and whether it is free or requires payment. The process then proceeds to Step 635.

Figure 6B:
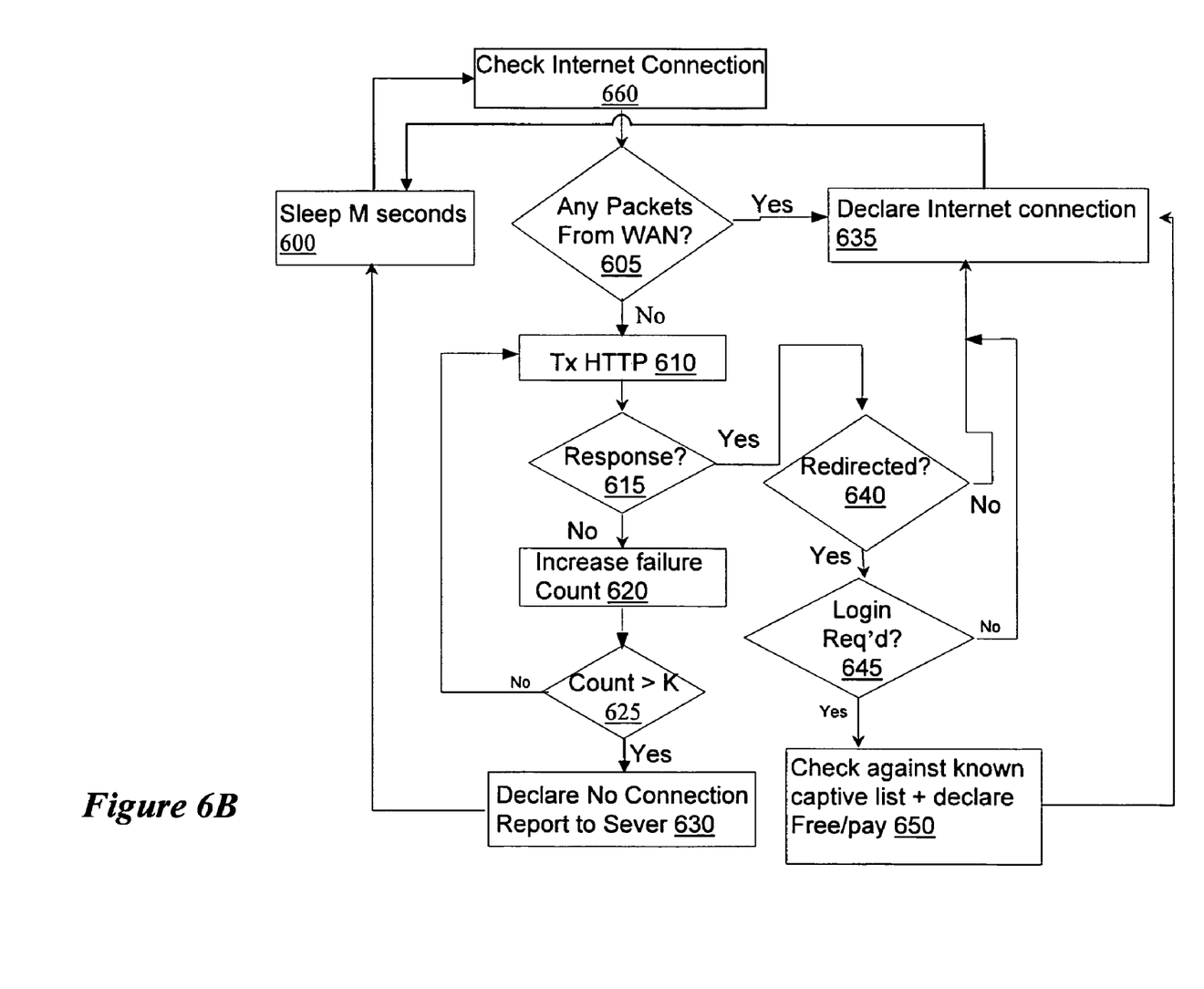
FIG. 6B is a slightly modified example of the Internet availability verification daemon of FIG. 6A.

FIG. 6B illustrate a slightly modified version the operation of an Internet availability verification daemon. The process of FIG. 6B is similar to that of FIG. 6A, except that at Step 640 it is checked whether the received response was received by redirecting the requested HTTP. If it was not redirected, it means that there is no captive portal and the process proceeds to Step 635. On the other hand, if redirecting occurred, it may mean one of two things: either the computer got logged automatically to the captive portal and was redirected to the requested URL, or the computer was redirected to a login page of the captive portal. Therefore, at Step 645 it is checked whether login is required and from there the process proceeds as in FIG. 6A.

The neighboring resources verification daemon operates as follows. To expedite wireless resources validation process, each client, is continuously verifying neighboring wireless resources that can be seen by the user terminal. This operation is called "measurement trip" and is executed by "neighboring resources verification daemon". During each measurement trip the terminal must temporarily disconnect from current resource and try to connect to the neighboring resource. This trip requires that time critical traffic be active, hence special traffic detector is employed.

If the client successfully associated with the neighboring resource, the client executes DHCP discovery to validate the ability of the resource to serve as an Internet access point. Successful validation is registered and reported to the network server. To avoid excessive traffic load, several trip reports are collected and sent together. To further reduce traffic load, the trip report is generated only if a change occurred in the resource's status. The number of observation per resource can be part of the reporting.

Figure 7:
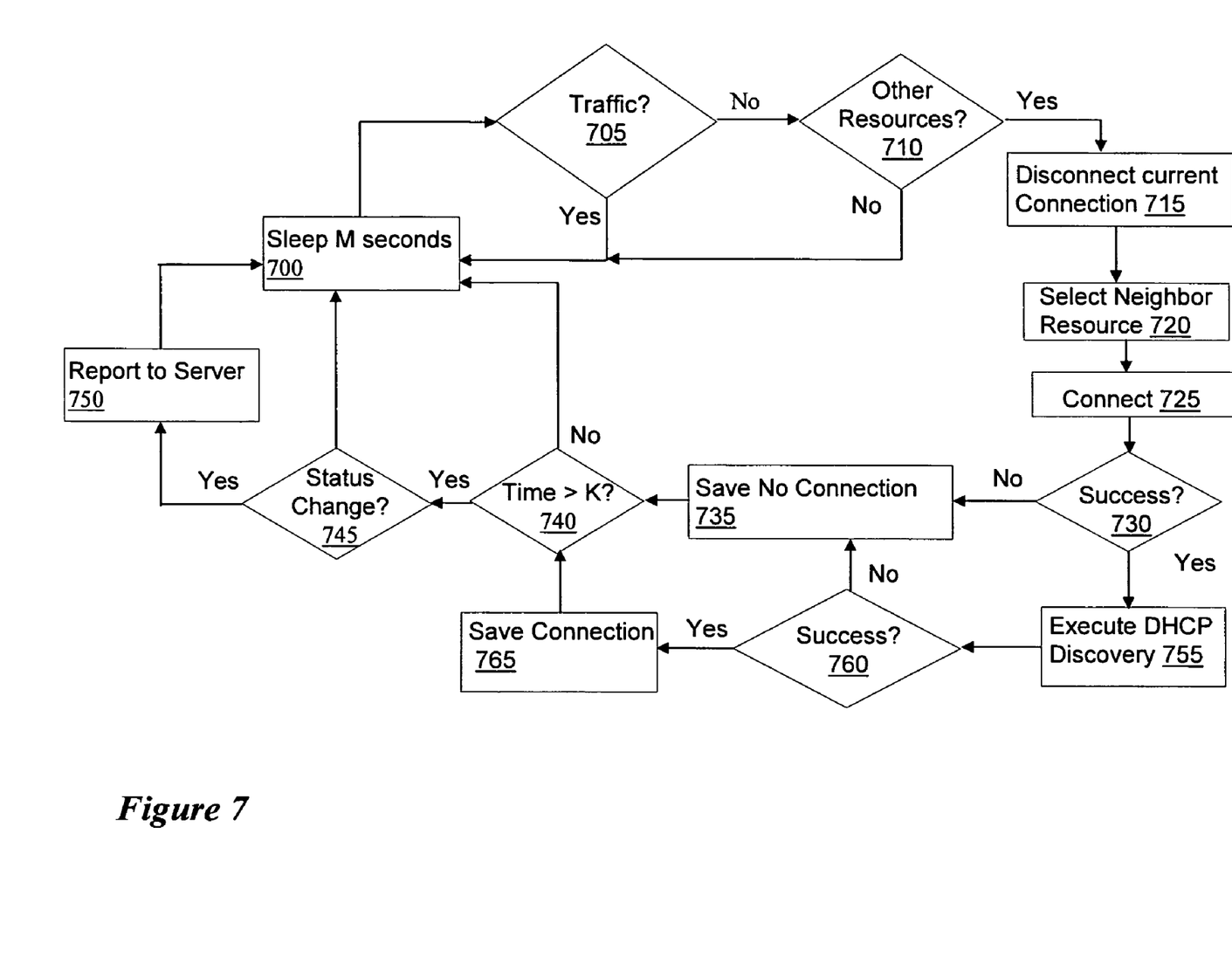
FIG. 7 is a flow chart illustrating the operation of a neighboring resources verification daemon according to an embodiment of the invention.

FIG. 7 is a flow chart illustrating the operation of a neighboring resources verification daemon according to an embodiment of the invention. As shown in FIG. 7, the daemon wakes up intermittently (Step 700) and performs neighboring resources verification. At Step 705 the daemon checks whether traffic pass via the current connection and, if so, it reverts to Step 700. If no traffic passes, at Step 710 the client checks whether there are other resources available for connection and, if not, it reverts to Step 700. Otherwise, the client disconnects the current connection at Step 715 and selects available resource at Step 720. At Step 725 the client attempts to connect to the selected resource. If the attempt is successful (Step 730), at Step 755 the client executes a DHCP discovery to verify that the resource enables connection to the Internet. If at Step 760 the request is successful, the information about the resource is stored and the process proceeds to Step 740. On the other hand, if at Step 730 the connection attempt was not successful, the information about this resource and the failed connection attempt are stored at Step 735, and the process proceeds to Step 740.

At Step 740 a counter determines whether a time period exceeds a given value, K. If not, the process reverts to Step 700. If the time period has exceeded, at Step 745 the client checks whether there was any change in the information relating to the stored resources. That is, if the information stored in Steps 735 and/or 765 relate to a newly discovered resources or relates to a resource that was already visited but that its status has been changed, then this data is reported to the network server 750 and the process reverts to Step 700.

When in a "trip," client can send either UDP, TCP or HTTP frame to a special server (cache server) and not wait for response. Once back from trip and back at the default connection the cache server can send response back to client. If response arrives, at least uplink connection at the checked AP was verified. The advantage of this approach is saving time that would be required to wait for the response while on the checked AP. This time period could be problematic for some transport protocols that do not "like" long breaks in connection. Notably, a feature of the subject invention is that when the client performs any excursion to test an AP, it may send a message to be received at the target server, but it does not need to wait for the response. For example, the client may disconnect from a current AP, connect to a different AP and send a message (e.g., a ping) to a target server and then reconnect to the original AP. The target server sends the response to the original AP. This can be done by, e.g., having the server send the message to the default AP or formatting the message sent by the client to include a header that indicate the return address to be the original AP. In this manner, the likelihood of interruption is service due to client excursions is reduced as the client spends less time on each excursion. Also, if after returning to the original AP, if the client does not receive the reply, it can request the server to send the reply again. This may occur in a situation where the server sends the reply before the client was able to reconnect to the original server, so that the client missed the reply.

Community generated data may also be used for access point verification. That is, a-priori information of WiFi resources can vastly increase probability of connection and selection of AP having the best connection quality and expedite connection time. For example, if specific WiFi resource is known to be very predictable, the client can favor it over other resources. The predictable resource does not require much verification and consequently allow speedy connection. Connection time is expediting by making sure the first attempt to connect (given multiple options) will be to a verified AP and consequently the likelihood for repeating trials is minimized.

Although a-priory information can be generated by the client over time, a-priory information can be the main goal of the community collaboration. That is, according to embodiments of the invention, users of the system are helping each other by characterizing WiFi resources to enable each other achieving high quality wireless Internet access. The a-priory information may consist:

Location Information.
    According to one illustrative embodiment, mapping of the resources may be done manually. For example, users may enter zip code or street address of their location when connecting to an AP. According to another embodiment, devices having automatic location capability (e.g., GPS) automatically determine their location each time they are connected to an AP and report this location.

Quality Information
    Each WiFi resource quality may be characterized by connection quality and persistency. The connection quality (average data rate, disconnection rate, etc.) may be registered each time a client connects to an AP. The frequency of connections indicates the visibility and persistency of the WiFi resource. It could also indicate how friendly the WiFi location is: shade, tables etc. All this information may be reported and stored at the system's central server facilities.

The locations of wireless resources can be determined automatically when GPS is part of the terminal. When GPS is not available, the client may check whether other already located resources are available at that location and, if so, the location is set to be similarity to those other resources. When these conditions are not fulfilled, manual resource mapping can be exercised by, e.g.,:

User highlights the desired resource to be mapped and open area map.

Map will normally initialized to show the general neighborhood of the selected wireless resource User then drags a special pointer to the assumed location where the resource is located and clicks to mark it.

Once selected resource is mapped, all other resources seen by the client at that time are marked as well. If some of the resources have already been mapped, their location can be refined.

Whenever a client gets connected, it continuously evaluates its own connection WiFi access point via AP verification and Internet verification daemons, as explained above. In addition, the client conducts "measurement trips" to evaluate access points in its neighborhood. Collectively the information gathered is used to estimate AP quality. For example:

Persistency is estimated by number of times the resource has been observed as being active by "measurement trips" and by connected client (via AP and Internet verification daemons)

Quality is estimated by average data rate and RSSI among all users that were connected to the specific resource lately This information is reported to the system central server for further processing to create compact data tables. According to one embodiment, the server receives all this reports and calculates for each AP an access quality estimation based on, e.g., the time elapsed from the first discovery of the AP to the most recent connection by any user, how many users successfully utilized the AP since its discovery, and the average data rate provided by the AP to all of the users.

A client in each terminal maintains wireless resource cache. The wireless resources cache incorporates the clients' own experience and data processed by the network server as mentioned above. For each wireless resource (ex. WiFi access point) there is a cache entry where some or all of the following information is stored:

SSID
    MAC address
    Quality/persistency
    Location
    Networking parameters (GW, Subnet, External IP, DNS)
    Access timing (Association, WPA (WiFi Protected Access), and DHCP response times)
    Captive portal rules (requires login, require payment, free)

This information can be sorted by location and resource quality. For example, to avoid overwhelming traffic load, cache update (by network server) may start with first installment containing the closest and the highest quality resources. As time goes by, installments with farther and lower quality resources can be downloaded. Although there will always be cases where cache has not been updated, only a single connection is necessary to perform this process and consequently assuring good service in most cases.

The first step in connecting to WiFi network is executed according to 802.11 standards by scanning for active networks (Step 410 of FIG. 4). Once a set of access points with sufficient (−90 dBm or higher) signal level are found, the client performs the following:

a) Check if found AP list includes favorite APs (favorite list includes APs that user defined their password). If yes, create "favorite candidate list" where APs are sorted by descending RSSI (415 of FIG. 4).

b) Checks found unlocked AP list against cached AP list. Collect all unlocked APs that are part of cached list into "cached candidate list" where APs are sorted by descending RSSI (430 of FIG. 430).

c) If at least one unlocked AP is found during the 802.11 scan (that is not part of the cached list), these APs are sorted by RSSI level to form "non-cached candidate list" where APs are sorted by descending RSSI (435 and 440 in FIG. 4).

d) The client selects an AP for connection as follows: if favorite candidate list has members, select the highest RSSI member, else     If cached list has members select the highest RSSI AP out of this list, else     If non-cached candidate list has members, select the highest RSSI of this list and     Execute 802.11 connection (420 of FIG. 4): association, authentication (WPA) and IP address acquisition (DHCP).

e) If DHCP process is successful (425 in FIG. 4), client declares connection to the selected AP. If 802.11 connection fail, temporary delete the correspondent AP from it's associated list and go back to d). If the connection achieved with a non-cached candidate list AP, proceed to f).

f) Client than checks for Internet access. If captive portal is identified, client declares the AP as captive portal AP and goes back to b. If captive portal is known as free (free captive portal list has been updated at client during log-in procedure) or no captive portal, client continues to g.

g) Client will now monitor traffic activity through AP passive test. If passive test fails, active test is executed.

h) If both tests fail, client will disconnect form the current AP and go to b).

i) If all tries fail, client declares failure to connect.

User can manually force connection to any AP by "double clicking" on the specific AP's icon.

After initial connection has been established, either wireless transmission or backhaul conditions may deteriorate to the point that the connection may need to be switched to another WiFi access point (roaming). Consequently the client periodically performs Internet connectivity tests as described above. If this test fails, the client must determine which access point out of WiFi scan list user terminal should switch to. This will be done through the process described above.

According to an aspect of the invention, the wireless network may be expanded by using a social network. One issue observed by the inventors is that generally private owners of radio access points are averse to sharing the AP resource with people they don't know. However, if there has been certain a priory contact, owners are much more likely to share the resource. Such an a priory contact may be made in the form of a social network. This can be explained with reference to FIG. 1. Assume for this example that access point 170d belongs to a user who also uses access device 120a, such as a laptop, a PDA, etc. The user generally is able to access the Internet 100 by connecting device 120a to access point 170d wirelessly. As is known, access point 170d operates to a certain range, which may generally allow other users to receive the signal of access point 170d. For example, terminal 120d may also be in the range of and be able to communicate with AP 170d.

The security of access point 170d may be set to allow no access to third parties, allow limited access to third parties, or allow all access by all third parties, by the choice of the owner. According to this embodiment, the owner may register access point 170d with server 110, as member of the social network. The owner may specify the amount of bandwidth the owner is willing to allocate to third parties who are in the vicinity of the access point 170d and who are members of the social network of server 110. The owner may specify other parameters, such as access password, etc. When third parties connect to access point 170d, their client report connection data of access point 170d to the server 110. In this manner, relevant and updated information regarding access point 170d is stored in the database of server 110.

Conversely, when the owner of device 120a is away from its own access point 170d, the client of device 120a queries its database to determine which member's access point is available and at what connection quality. The client then connects the device 120a to the preferred access point. The client then sends connection information to the server 110 to update its database. In this manner, by agreeing to provide connectivity via its own access point, the user is able to obtain access to the network when the user is away from its own access point. That is, other members in the social network will allow the user to access the Internet via their own access points. Moreover, a database is built which stores relevant and updated information regarding the location and quality of all members' access points. In this way, availability of radio access point is increased and connection to access points is improved.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described methods and systems may be implemented in a wide variety of programming or scripting languages, such as Assembler, C/C++, perl, shell, PHP, Java, etc.

The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method for creating and maintaining a dynamically expendable and updatable wireless network, comprising:
distributing a plurality of clients to a plurality of users mobile devices;
installing a server and coupling the server to the Internet;
receiving at the server resource reports from the clients and using the reports to construct and update a network of Internet connectivity resources, wherein for each resource the reports comprise at least the resource geographical location, the signal strength, and connectivity quality;
transmitting to the plurality of clients updates, the updates comprising location, connection profile, and connectivity quality of resources in at least the geographical vicinity of each respective mobile device; and
operating each client to periodically perform neighboring resources verification wherein during the neighboring resources verification the client is operated to perform at least one of:
checking whether communication traffic is flowing between the mobile device and a default resource;
checking whether other resources are available at the current geographical location of the mobile device;
disconnecting from current resource, select a neighboring resource, and attempt to connect to the neighboring resource, and:
if connection is successful, execute Dynamic Host Configuration Protocol (DHCP) discovery and, if successful, storing neighboring resource identifier (ID), geographical location, and availability of Internet connection, then proceed to check whether counter passed a predetermined count threshold;
if connection is not successful, storing neighboring resource ID, geographical location, and indication of unsuccessful connection attempt;
checking whether counter passed a predetermined count threshold and, if not, go to sleep for a predetermined period; otherwise transmit report to server.

2. The method of claim 1, wherein when the neighboring resource connection is successful, the client sends a message to a target server and terminate the connection to the neighboring resource and reconnect to the default resource.

3. A method for performing neighboring resources verification in a current geographical location of a mobile device, comprising:

a. checking whether communication traffic is flowing between the mobile device and a current resource and, if so, sleep for a predetermined period; otherwise
b. checking whether other resources are available at the current geographical location of the mobile device and, if not, sleep for a predetermined period; otherwise
c. disconnect from the current resource, select a neighboring resource, and attempt to connect to the neighboring resource, and:
d. if connection is successful, send message to a target server, disconnect from the neighboring resource, reconnect to the current resource, and listen for a reply from the target server via the current resource.

4. The method of claim 3, wherein the step of sending a message comprises appending to the message a return address pointing to the current resource.

\* \* \* \* \*